Patented Dec. 19, 1944

2,365,516

UNITED STATES PATENT OFFICE 2,365,516

REFRIGERANTS AND PROCESS OF MAKING THEM

Anthony F. Benning, Woodstown, and Frederick B. Downing, Penns Grove, N. J., and Roy J. Plunkett, Wilmington, Del., assignors to Kinetic Chemicals, Inc., Wilmington, Del., a corporation of Delaware No Drawing. Application July 10, 1940, Serial No. 344,666

5 Claims. (Cl. 260—653)

This invention relates to the production of fluoro-halogen compounds of olefines by a new process and to certain new compounds which are produced by the process.

It is an object of this invention to produce halogen reaction products of olefines containing fluorine, particularly fluorinated acyclic hydrocarbon derivatives containing at least another halogen and two carbon atoms. Another object of the invention is to produce such compounds by a process in which hydrogen halides are reacted with fluoro ethylenes or halogenated fluoro ethylenes. Another object is to substitute a better method for the production of certain known compounds of this type than that which involves the use of $SbF_3$. Another object of the invention is to produce the product called 1,1,2,2-tetrafluoro-1-chloro-ethane. Another object of the invention is to produce the compound represented by the formula $CHF_2CClF_2$.

The objects of this invention are accomplished by the manufacture of fluoro-halogen compounds of olefines by a process involving the interaction of halogenated olefines and hydrogen bromide or hydrogen chloride in the presence of a catalyst, the reactions being generally of the type:

$$HX + CY_2 = CY_2 \rightarrow C_2Y_4HX$$

where X is chlorine or bromine, and Y is H, F, or halogen of which at least one is F.

In this invention halogenated fluorine compounds are produced by the addition of chlor or brom acids to fluoro-olefines or fluoro-halogeno olefines, in the presence of a catalyst, such as carbon, preferably at temperatures about 125° C., and under pressures ranging from sub-atmospheric to super-atmospheric. The process is particularly useful in producing fluoro-halogeno-ethanes from mono-olefines which are gaseous at ordinary temperature and pressure, but it is not limited thereto and may be applied with proper modifications in temperature, length of the time of contact, and the other factors, to the treatment of liquid olefines. Hydrobromic and hydrochloric acids may be used. The process is useful with single or mixed olefines.

In general, proportioned mixtures of the vapors of a fluoro-olefine, or fluoro-halogeno-olefine and the selected acid are passed through solid contact materials consisting of particles of carbon. The vapors may be premixed or led separately into the reaction chamber. The gases may be preheated before entrance in the reaction chamber, although this is not necessary. After passing through the reaction tube the effluent gases may be purified, cooled, and liquefied.

The reaction tube may be made out of various materials: Glass, quartz, carbon and metal tubes have been used successfully. Carbon, silver and platinum tubes have proven generally advantageous. The addition reaction may be carried out under various pressures although super-atmospheric pressures as a general rule give better results.

While the invention is susceptible of considerable variation and modification in the manner of its practical application, particularly as regards the nature and proportion of the reactants, the temperature, pressure and exact method of procedure, the following examples, run at 1 atm. pressure unless otherwise specified, and in which the parts are by weight, will serve to illustrate how the invention may be practiced.

Example I

About 17 parts of $C_2F_4$ and 6 parts of anhydrous HCl were passed through 200 parts of carbon in a quartz tube maintained at about 200° C. A contact time of about 10 seconds was maintained. The effluent gases were passed through a water scrubber and after drying condensed. About 15 parts of reaction product were obtained, about 10 parts of which was $C_2HClF_4$ which had a boiling point of about −10° C.

Example II

About 18 parts of $C_2F_4$ and 6.8 parts of anhydrous HCl were passed through 40 parts of activated carbon in a course of four hours through a nickel-jacketed carbon tube. The temperature was maintained at about 300° C. with a contact time of 15 seconds. The effluent gases were washed, dried and collected. About 24 parts of reaction product were obtained. A fractionation of the condensate showed about 90% of the material boiling between the range of −9 to −10° C. The molecular weight from the vapor density of this product was found to be 139.2 as compared to the calculated value of 136.5 for $C_2HF_4Cl$. Some of the physical properties of $CF_2ClCHF_2$ are as follows:

Freezing point, −117° C.
Boiling point, −10.2° C.
Liquid density at 44.7° C. 1.299 g./cc.
Vapor density, 5.75 g./l. 22.4° C. and 752.6 mm. Hg.

Example III

About 42 parts of $C_2F_4$ and 31 parts of anhydrous HCl were passed through 40 parts of activated carbon in the course of two hours through a nickel-jacketed silver tube. A temperature of about 300° C. and a content time of about 15 seconds were maintained. The effluent gases were washed, dried and collected. About 53 parts of product were obtained of which about 83% was $C_2HF_4Cl$ with a boiling range of —9 to —10° C.

*Example IV*

About 37 parts of $C_2F_4$ and 45 parts of anhydrous HCl were passed through 50 parts of activated carbon in a carbon tube in the course of five hours. A contact time of about 20 seconds was maintained. The carbon tube was maintained at about 400° C. during the course of the run. About 45 parts of product were obtained, a large percentage of which was $CF_2ClCHF_2$.

*Example V*

A run similar to Example IV was repeated except in this run a platinum lined tube was used and the contact time of the reactants cut in half. A lower conversion to $CF_2ClCHF_2$ was found in this case than that found in Example IV.

*Example VI*

About 75 parts of $C_2F_4$ and 106 parts of anhydrous HCl were slowly passed through activated carbon contained in a silver tube at such a rate as to maintain a contact time of about 50 seconds. The temperature was kept at about 200° C. The effluent gases were washed, dried and collected. About 93 parts of crude product which analyzed about 93% $C_2HF_4Cl$ were obtained which represents an organic recovery of about 95%.

*Example VII*

The procedure of Example VI was repeated except that a platinum lined base metal tube was used. The temperature was maintained at 150° C. Flow was at such a rate as to maintain a contact time of about 65 seconds. The product was similar to that of Example VI.

*Example VIII*

About 65 parts of $C_2F_4$ and 48 parts of anhydrous HCl were passed through activated carbon contained in a steel-jacketed carbon tube. The temperature of the tube was kept at about 200° C., the contact time of the reactants at about 40 seconds and the pressure of the reaction at about 30 pounds per square inch absolute. About 87 parts of crude product were obtained. The crude analyzed over 85%

$$CF_2ClCHF_2$$

which had a boiling range of —9 to —10° C.

*Example IX*

About 490 parts of $C_2F_4$ and 360 parts of anhydrous HCl were reacted in a carbon-filled silver tube. A pressure of 150 pounds per square inch absolute, a contact time of about 15 seconds, and a temperature of about 300° C. were used. About 600 parts of crude were obtained which analyzed over 90% $CF_2ClCHF_2$.

*Example X*

About 245 parts of $C_2F_4$ and 180 parts of anhydrous HCl, previously premixed, were continuously passed through carbon in a silver tube. The pressure was maintained at about 100 pounds per square inch absolute with a contact time of about 30 seconds and a temperature of about 325° C. The effluent gases were washed, dried and compressed in an ice water cooled receiver which condensed most of the $CF_2ClCHF_2$. The unreacted $C_2F_4$ was continuously fed back into the silver addition tube.

*Example XI*

About 233 parts of $CF_2=CFCl$ and 190 parts of anhydrous HBr were passed through activated carbon in a carbon tube heated to about 200° C. A contact time of 20 seconds was maintained. The effluent gases were passed through a water-ice cooled condenser which collected most of the addition product, then through a series of washers and driers and finally a low temperature condenser which received the unreacted $C_2F_3Cl$. About 400 parts of crude product were collected. The crude product upon distillation yielded relatively pure $C_2F_3ClHBr$ which had a boiling point of about 44.6 to 44.8° C. The vapor density was found to be 7.40 grams per liter at 60° C. and 771 mm. pressure.

*Example XII*

About 110 parts of $CFCl=CF_2$ were mixed with about 70 parts of HCl and passed during a period of 5 hours over an active carbon maintained at a temperature of 200° C. The affluent gases were scrubbed to remove acid and the resulting products condensed. Examination of these products showed that they consisted of a mixture of fluoro-chloro derivatives, one of which was $$CF_2ClCHFCl$$

having a boiling point of about 25° to 28° C.

The temperature and pressure used in effecting the addition may vary within relatively wide limits. Satisfactory results have been obtained in the use of temperatures as high as 400° C., and even higher temperatures may be used so long as they do not cause decomposition of the reactants, but the preferred temperature range is between 125° C. to 350° C. For the production of $CF_2ClCHF_2$, temperatures around 190° to 250° have been found especially satisfactory. Subatmospheric, atmospheric, and superatmospheric pressures may be used. Satisfactory results have been obtained with the use of pressures ranging from 1 atm. absolute to 10 atm. absolute, although pressures greater or less are suitable, the controlling factor in the choice of the pressure, and temperature also, being the attainment of high yields of a desired compound with the minimum of undesirable by-product formation.

Various forms of carbon may be used as catalysts, for example, charcoal prepared from various vegetable sources, bone char, coke from petroleum, and from coal. In general material consisting essentially of carbon which has been prepared by the distillation of organic material has been found satisfactory. The carbon, regardless of source and mode of preparation, preferably should have adsorptive properties. Very desirable results have been obtained in the use of the so-called activated carbons such as may be prepared in various well known ways, for instance, by heating carbon to high temperatures in the presence of air, or steam.

The contact time used may also vary according to the reactants and the proportions of the reactants used. Generally speaking, it is preferable to employ a contact time of about 10 to 120 seconds but longer times are successful. In the production of $CF_2HCF_2Cl$ especially desirable results have been obtained by the use of pressures of about 45 to 150 pounds per square inch, temperatures of 150° to 325° C., and contact times from 15 to 110 seconds.

The reaction and the separation or isolation of the products by distillation fractional or otherwise, may be carried out continuously or in separate steps. It is not necessary that the pressure of the two steps be the same. The process of effecting the addition of halogen acids to the substituted olefines may be used with the fluoro ethylenes or fluoro halogeno ethylenes as illustrated by some of the following unsaturated compounds:

$CF_2=CFCl$
$CF_2=CH_2$
$CFCl=CHCl$
$CFCl=CCl_2$
$CHCl=CClF$
$CHF=CCl_2$
$CHCl=CF_2$
$CHF=CF_2$
$CHCl=CHF$
$CH_2=CHF$, etc.

The invention herein disclosed has the advantage of producing economically certain fluorine containing compounds which are now obtainable only at high cost by means of HF in the presence or absence of antimony catalysts.

The various products obtained in carrying out the invention find application for various commercial purposes. Some of them are excellent refrigerants and solvents. Thus, 1,1,2,2-tetrafluoro-1-chloro ethane has properties very desirable in a refrigerant, also $C_2HF_3ClBr$ besides possessing very desirable properties as a solvent may be used as a starting material for the preparation of $C_2F_4HCl$. Many of the products formed have been found to be odorless, non-inflammable, non-corrosive and non-toxic.

Some of the compounds produced have been made by other methods, but others are new. The process disclosed herein provides a means of obtaining them in much higher yields and without undesirable side reactions. The new process also provides a means of obtaining a large number of bromo fluoro compounds which may be hydrolyzed to fluorine-containing alcohols.

As many apparently widely different embodiments of this invention may be made without departing from the spirit and scope thereof, it is understood that we do not limit ourselves to the specific embodiments thereof except as defined in the appended claims.

We claim:
1. In the process of adding a hydrohalide of the group consisting of HCl and HBr to a halogen substituted ethylene containing 1 to 4 halogen atoms of which at least one is fluorine and the others are chlorine, the steps which comprise heating an anhydrous mixture of the hydrohalide and the halogen substituted ethylene at temperatures of from about 150° C. to about 400° C. in the presence of active carbon for sufficient time to produce a substantial amount of the addition product and then separating the addition product from the reaction mixture.

2. In the process of adding a hydrohalide of the group consisting of HCl and HBr to $CFCl=CF_2$, the steps which comprise heating an anhydrous mixture of the hydrohalide and the $CFCl=CF_2$ at temperatures of from about 150° C. to about 400° C. in the presence of active carbon for sufficient time to produce a substantial amount of the addition product and then separating the addition product from the reaction mixture.

3. In the process of adding HCl to a halogen substituted ethylene containing 1 to 4 halogen atoms of which at least one is fluorine and the others are chlorine, the steps which comprise heating an anhydrous mixture of HCl and the halogen substituted ethylene at temperatures of from about 150° C. to about 400° C. in the presence of active carbon for sufficient time to produce a substantial amount of the addition product and then separating the addition product from the reaction mixture.

4. In the process of making $CF_2ClCHFCl$, the steps which comprise heating an anhydrous mixture of $CFCl=CF_2$ and HCl at a temperature of about 200° C. in the presence of active carbon for sufficient time to produce a substantial amount of the $CF_2ClCHFCl$ and separating the $CF_2ClCHFCl$ from the reaction mixture.

5. In the process of making $C_2HBrClF_3$, the steps which comprise heating an anhydrous mixture of HBr and $CFCl=CF_2$ at about 200° C. in the presence of active carbon for sufficient time to produce a substantial amount of $C_2HBrClF_3$ and separating the $C_2HBrClF_3$ from the reaction mixture.

ANTHONY F. BENNING.
FREDERICK B. DOWNING.
ROY J. PLUNKETT.

CERTIFICATE OF CORRECTION.

Patent No. 2,365,516. December 19, 1944.

ANTHONY F. BENNING, ET AL.

It is hereby certified that error appears in the printed specification of the above numbered patent requiring correction as follows: Page 1, first column, line 36, for the word "about" read --above--; page 2, first column, line 3, for "content" read --contact--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.